Nov. 25, 1947. A. S. VOLPIN 2,431,653

SLUSH PUMP PISTON

Filed Oct. 18, 1945

A. S. VOLPIN
INVENTOR.

BY Lester B. Clark
Ray L. Smith

ATTORNEYS

Patented Nov. 25, 1947

2,431,653

UNITED STATES PATENT OFFICE 2,431,653

SLUSH PUMP PISTON

Alexander S. Volpin, Houston, Tex.

Application October 18, 1945, Serial No. 623,113

4 Claims. (Cl. 309—23)

The invention relates to a slush pump piston and particularly to the mechanism whereby the sealing rubber is replaceably positioned upon the supporting structure and retained therein during operation.

It will be understood that slush pump pistons are subjected to tremendous pressures and to considerable wear, that the problem of changing the piston rubbers is rather tedious and with this in mind, the present construction has been devised so that the sealing rubbers which are subjected to wear may be readily replaced without the use of complicated structures.

It is one of the objects of the invention to provide a slush pump piston sealing ring which has a reinforced structure embedded therein, which structure is also utilized in clamping the piston in operating position.

Still another object of the invention is to provide a retaining mechanism for slush pump piston rubbers wherein the resiliency of the sealing rubber itself tends to confine the retaining mechanism in position.

Another object of the invention is to provide a retaining assembly for slush pump piston rubbers wherein a plurality of retaining members are resiliently held in position.

A still further object of the invention is to provide a slush pump piston structure with a support rubber structure wherein the rubber may be slipped over the support, the retainer segments placed in position to prevent removal and such segment in turn resiliently held in position by the piston rubber.

Other and further objects of the invention will be readily apparent when the following description is considered in connection with the accompanying drawings, wherein—

Figure 1:
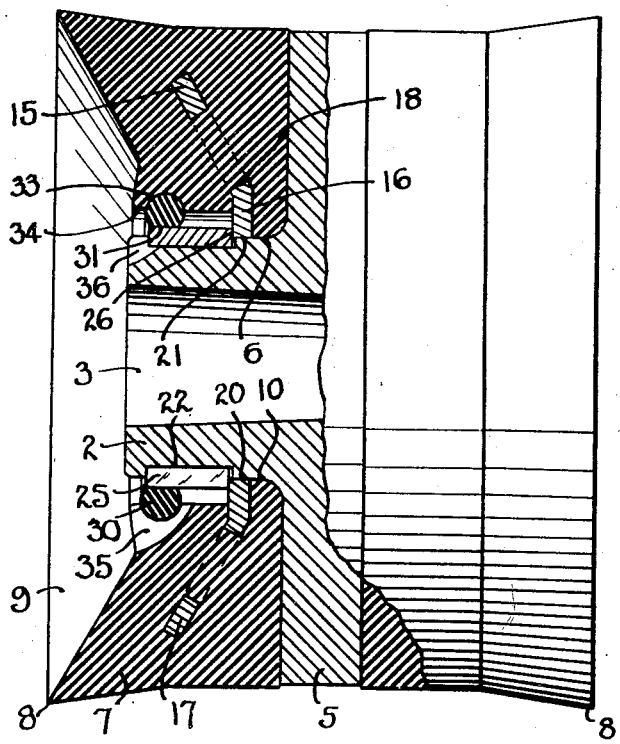
Fig. 1 is a side elevation of a slush pump piston constructed in accordance with the invention and illustrating certain of the parts in section.

In Fig. 1 the piston body 2 has been shown as being in the form of a hub having the tapered opening 3 to receive the end of the piston rod by which the piston is reciprocated. This hub has the flange 5 extending radially so as to provide a seat 6 for the slush pump piston rubber or sealing member 7. This rubber is of a configuration to engage the seat 6 and to be supported by the flange 5 during the working stroke of the piston. This rubber has a slightly flared periphery 8 and is dished at 9 on the outer end.

Figure 2:
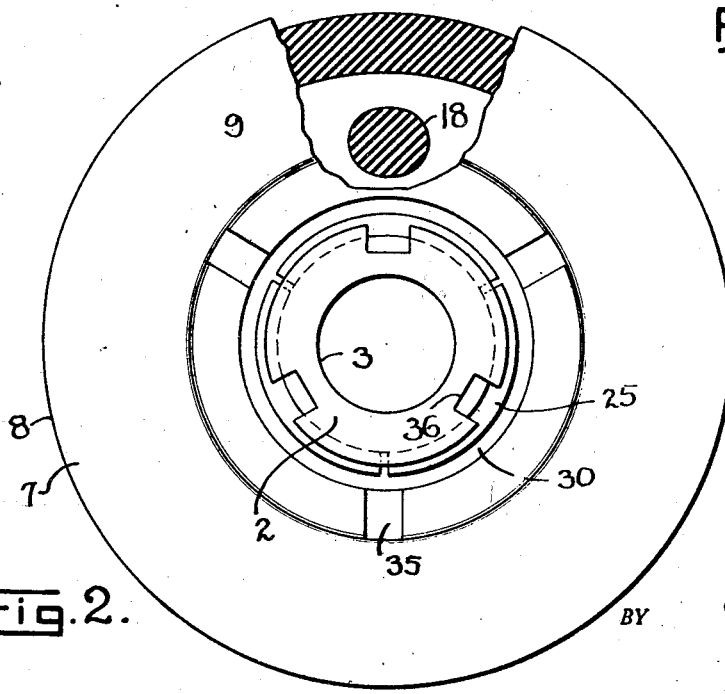
Fig. 2 is an end view of the piston of Fig. 1 with certain parts broken away to show the arrangement of the reinforcing structure.

The central opening 10 in the rubber is arranged to fit over the hub 2 and this rubber has the reinforcing plate 15 imbedded or vulcanized therein. This plate is of peculiar configuration in that it has the circular portion 16 and the angularly inclined periphery 17. A plurality of openings 18 therein permit the rubber to be vulcanized about the plate. The central opening 20 in this plate is of a size to fit snugly over the shoulder portion 21 of the hub piston body 2. This hub is provided with a groove or annular recess 22 which is positioned inwardly from the end a short distance. After the piston rubber 7 is slipped over the hub then the locking segments 25, three of which are shown in Fig. 2, will be placed in the recess 22. These locking segments are of a size to abut the inner portion of the reinforcing ring 15 as at 26 so as to prevent its removal from the hub. In this manner a metal to metal contact is provided between the reinforcing ring 15 and the hub of the piston body.

In order to hold these locking segments 25 in position in the recess 22 an annular grip ring 30 is shown as having been passed over the segments. This ring has a flattened inner surface 31 which is arranged to grip the three locking segments 25 and is of a shape and size to be squeezed into the groove 33 formed on the inner surface 34 of the annular rubber ring 7. At one circular position the ring may be cut out to provide the opening 35 so that a suitable tool may be worked in under the gripping ring 30 to remove it.

The ring 30 is of such size that it will have to be forced in between the locking segments 25 and will snap into the groove 33.

When the lip 8 of the piston is compressed to be inserted in the pump liner, this will of course compress the gripping ring 30 so that it will be tighter in order to insure that the rubber cannot come loose from the piston body. In order to remove the locking segments the end of the hub 2 may have an opening 36 therein into which a suitable tool may be driven to displace the segments after the gripping ring 30 has been removed.

The advantages of the foregoing construction seem obvious because the ring will be firmly held in position due to the metal to metal contact between the hub, the locking segments and the reinforcing ring 15. This insures sealing of the rubber rings against the hub as at 6 and against the supporting face 18 of the flange 5.

Broadly the invention contemplates a quickly replaceable slush pump piston rubber or seal ring which can be clamped or unclamped from operating position very readily and without the use of any special tools.

What is claimed is:

1. A slush pump piston including a body, a flange thereon, an annular seal ring disposed on each side of said flange, each ring including an annular combination retainer and a reinforcing plate embedded therein, a portion of said plate being exposed in the central ring opening to provide a retainer shoulder, and means including a plurality of locking segments on said body to engage said shoulder to hold the ring on said body.

2. A slush pump piston including a body, a flange thereon, a seal ring disposed on each side of said flange, each ring including an annular combination retainer and a reenforcing plate embedded therein, a portion of said plate being exposed in said opening to provide a retainer shoulder, and means on said body to engage said shoulder to hold the ring on said body, said means including a groove in said body, locking segments disposed therein after positioning of the ring on the body, and gripping means to hold said segments in said groove and abutting the exposed shoulder of said plate.

3. A slush pump piston including a body, a flange thereon, an annular seal ring disposed on each side of said flange, each ring including an annular combination retainer and a reenforcing plate embedded therein, a portion of said plate being exposed in the central ring opening to provide a retainer shoulder, means including a plurality of locking segments on said body to engage said shoulder to hold the ring on said body, and resilient means encircling said segments.

4. A slush pump piston including a body, a flange thereon, an annular seal ring disposed on each side of said flange, each ring including an annular combination retainer and a reenforcing plate embedded therein, a portion of said plate being exposed in the central ring opening to provide a retainer shoulder, means including a plurality of locking segments on said body to engage said shoulder to hold the ring on said body, and resilient means encircling said segments and adapted to be squeezed into the central opening so as to bear against said segments.

ALEXANDER S. VOLPIN.

REFERENCES CITED

The following references are of record in the file of this patent:

UNITED STATES PATENTS

| Number | Name | Date |
|---|---|---|
| 1,746,733 | Lamb | Feb. 11, 1930 |
| 1,898,292 | Crickmer | Feb. 21, 1933 |
| 2,189,839 | Sharp et al. | Feb. 13, 1940 |
| 2,305,282 | Taylor et al. | Dec. 15, 1942 |
| 2,317,122 | Volpin | Apr. 20, 1943 |
| 2,325,556 | Taylor et al. | July 27, 1943 |